(12) United States Patent
Duranti (10) Patent No.: US 11,919,047 B2
(45) Date of Patent: Mar. 5, 2024

(54) MACHINE FOR THE REMOVAL OF WASTE FROM WORK BENCHES OF WORK MACHINES

(71) Applicant: C.F. LAMIERE DI FANTINI CLAUDIO DURANTI S. ZANNI M. & C. S.A.S., Coriano (IT)

(72) Inventor: Simone Duranti, Coriano (IT)

(73) Assignee: C.F. LAMIERE DI FANTINI CLAUDIO DURANTE S. ZANNI M.. & C.S.A.S., Rimini (IT)

(*) Notice: Subject to any disclaimer, the term of this patent is extended or adjusted under 35 U.S.C. 154(b) by 417 days.

(21) Appl. No.: 17/435,116

(22) PCT Filed: Feb. 24, 2020

(86) PCT No.: PCT/IB2020/051551
§ 371 (c)(1),
(2) Date: Aug. 31, 2021

(87) PCT Pub. No.: WO2020/183266
PCT Pub. Date: Sep. 17, 2020

(65) Prior Publication Data
US 2022/0134387 A1    May 5, 2022

(30) Foreign Application Priority Data
Mar. 11, 2019    (IT) .................. 102019000003479

(51) Int. Cl.
*B08B 1/00*    (2006.01)
*B08B 1/04*    (2006.01)
(Continued)

(52) U.S. Cl.
CPC .............. *B08B 1/005* (2013.01); *B08B 1/008* (2013.01); *B08B 1/04* (2013.01); *B23C 3/13* (2013.01); *B23K 26/16* (2013.01); *B23K 26/702* (2015.10)

(58) Field of Classification Search
CPC .......... B08B 1/005; B08B 1/008; B08B 1/04; B23C 3/13; B23K 26/70; B23K 26/702; B23K 26/16
See application file for complete search history.

(56) References Cited

U.S. PATENT DOCUMENTS

| 8,245,376 B2 | 8/2012 | Graf et al. |
| 2012/0138105 A1 | 6/2012 | Perales |
| 2018/0087490 A1 | 3/2018 | Fraughton et al. |

FOREIGN PATENT DOCUMENTS

| DE | 3937928 A1 | 5/1991 |
| DE | 102010010382 A1 | 9/2011 |

(Continued)

OTHER PUBLICATIONS

Search report for related PCT/IB2020/051551 dated Aug. 6, 2020.

*Primary Examiner* — Randall E Chin
(74) *Attorney, Agent, or Firm* — Scott, P.C.

(57) ABSTRACT

A machine for the removal of waste from work benches includes plates arranged in a grid, where the machine includes a main body equipped with at least one channel suitable for riding over at least one plate of the grid and for sliding with respect to it in an advancing direction coinciding with the longitudinal development direction. The channel includes a top delimitation, a pair of lateral delimitations, and a downward-facing inlet opening. The lateral delimitations of the channel are defined by respective rotary tools where the top delimitation includes at least one rolling surface capable of rolling in the advancing direction so as to advance on the top edge. The tools have rotation axes (Continued)

inclined with respect to the advancing direction and rotate so as to pull down the rolling surface when they act on the flanks of the plate inserted in the channel.

16 Claims, 5 Drawing Sheets

(51) Int. Cl.
*B23C 3/13* (2006.01)
*B23K 26/16* (2006.01)
*B23K 26/70* (2014.01)

(56) References Cited

FOREIGN PATENT DOCUMENTS

| | | | |
|---|---|---|---|
| EP | 1706218 | A1 | 10/2006 |
| EP | 2 570 200 | A2 * | 3/2013 |
| FR | 2526842 | A1 | 11/1983 |
| FR | 2 865 154 | * | 7/2005 |
| GB | 210773 | A | 9/1924 |

* cited by examiner

MACHINE FOR THE REMOVAL OF WASTE FROM WORK BENCHES OF WORK MACHINES

The present invention concerns a machine for the removal of waste from work benches of work machines. The invention is particularly studied for cleaning work benches comprising a series of plates that are parallel to one another, in general used to support the pieces to be worked with respect to laser cutting machines. However, this does not rule out other uses.

STATE OF THE ART

The work benches of laser cutting machines are currently substantially a series of support plates, in general, but not only, metallic, arranged parallel to one another to form a grid, where the tops of the plates are toothed with constant pitch. The top of the teeth as a whole defines the support plane of the objects to be worked, which must be of maximum precision. However, the cutting melts the material, which drips onto the plates, producing incrustations that prevent the correct positioning of the pieces. The problem is therefore of great importance given the extreme precision expected from the type of machine. The plane often loses efficiency so much that it has to be replaced, with substantial costs.

In order to alleviate the problem machines for cleaning grids have been devised. One of these is for example known from patent application U.S. Pat. No. 8,245,376 (Trumpf). This machine provides for the cleaning of one plate at a time, riding over it through a sled resting on the top of the teeth and through a pair of mills projecting to wrap around the flanks thereof. The cleaning machine moves along the plate by sliding of the sled on the top of the teeth. The problem is that the cleaning machine, being equipped with motors, has a non-negligible weight, and the mills gripping onto the waste pull the sled towards the teeth, for which reason the latter are subject to wearing by friction, which upsets the planarity of the work plane. After one or two cleans it is therefore necessary to replace the plates of the work plane, for which reason the solution seems only to be a stopgap measure, not advantageous given the costs of the cleaning machine. The problem is even greater if the waste to be removed is metallic.

A further machine is known from patent application WO1706218 (Thuet), which with respect to the machine described previously replaces the mils with knives having reciprocating motion that scrape the waste from the flanks of the plates. However, this is actually worse than the Trumpf machine, since the knives in order to be able to act pull the sled towards the teeth increasing the pressure thereof, which moreover is not constant during advancing, but in bursts, generating particularly uneven wearing. In order to alleviate the problem Thuet applies a damper to the sled, but this only makes the knives ineffective along the stroke of the damper, and reproposes the problem of jumping wearing when it reaches the end stop where the knives are effective. In practice, it is an impractical machine.

There are also cleaning machines in other fields, like for example the cleaning of cables or tubes, but the problems that they tackle are different and therefore they cannot be used for the grids of laser machines. Among these, for example, there are the known machines for cleaning cables described in patent applications DE3937928 and FR2526842. They act by surrounding the cable for the full 360° with cleaning brushes that also determine the gripping thereof by pushing them towards one another. A sled allows the advancing along the cable by resting on random and variable sides, since it is an aspect that does not have any relevance for a cable. The same principle cannot be applied to grids, since it would generate cleaning and griping on all sides of the plate, and since the tool would be more energetic than a brush, it would also file down the top of the teeth.

A machine for cleaning the outside of boiler pipes is described in GB210773. This machine provides for a pair of knives that act like a jaw to push each other against nearby pipes. In fact, therefore, if used for cleaning grids it would have to be adopted to clean two parallel plates simultaneously. However, the application thereof would actually be worse than those for cleaning cables described above, since as well as gripping on every side of the piece to be cleaned with the tool, and thus not making a distinction of the areas to be respected, it acts by banging of the knives. This is effective with lime scale waste that falls in flakes, but it is ineffective with molten metal waste. Moreover, the banging would bend and distort the surface of the teeth and therefore the work plane.

Ultimately, there is a need in the field for an improved machine for cleaning encrusted work benches to restore the planarity thereof, like those for laser cutting, given the lack of an effective solution provided by the machines quoted above.

The purpose of the present invention is to totally or partially overcome the problems of the prior art.

A preferred purpose of the present invention is to provide a machine for removing metallic waste that respects the planarity of the work plane.

A further preferred purpose of the present invention is to provide a machine for removing waste that prolongs the useful operating life of the work planes to which it is applied.

A further preferred purpose of the present invention is to provide a machine that is simple and practical to use.

Another further preferred purpose of the present invention is to provide a machine for removing waste that is simple to make and has low operating costs.

GENERAL INTRODUCTION

According to a first general aspect thereof, the present invention concerns a machine for the removal of waste from work benches (1) of work machines, where the work benches comprise a series of plates (2) arranged parallel to one another to form a grid, they have a longitudinal development direction (L) and a top edge (3) equipped with teeth (5), where the top of such teeth defines a horizontal support plane (WB) for the pieces to be worked, for example to be laser cut, the machine (10, 110) comprises a main body (11) equipped with at least one channel (12) suitable for riding over at least one plate (2) of said grid (1) and for sliding with respect to it in an advancing direction coinciding with said longitudinal development direction (L);

for this purpose said channel (12) comprises a top delimitation (15, 20), a pair of lateral delimitations (22) and a downward-facing inlet opening;

the lateral delimitations of the channel 12 are defined by respective rotary tools (22), characterised in that:

the top delimitation comprises at least one rolling surface (16, 21) capable of rolling in the advancing direction (L) so as to advance on the top edge (3), said tools (22) have rotation axes (24) inclined with respect to the advancing direction (L) and rotate so as to pull down the rolling surface when they act on the flanks (6, 7) of the plate (2) inserted in the channel (12).

According to some preferred embodiments of the invention said top delimitation comprises at least two areas intended to rest on the surface of the teeth, where one area precedes and the other follows said rotary tools in said advancing direction, where at least one of said areas comprises said at least one rolling surface.

In this case, preferably, said rolling surface at least partially precedes the position of said rotary tools (22), in the advancing direction (L).

According to some preferred embodiments of the invention both of said areas comprise at least one rolling surface.

According to a preferred general characteristic said at least one rolling surface is a surface of cylindrical revolution or the surface of a track.

For example, the surface of the track intended to define the top delimitation for resting on the top of the teeth is flat.

According to some preferred embodiments of the invention, in the case in which there are said at least two areas intended to rest on the surface of the teeth, at least said rolling surface that at least partially precedes the position of said rotary tools (22) is a surface of cylindrical revolution or a flat surface of a track.

Preferably, both said rolling surfaces are a surface of cylindrical revolution or a flat surface of a track.

According to some preferred embodiments said top delimitation defines a rolling line (P) on the top of the teeth (5).

For example, said top delimitation comprises at least one front rolling means and a rear rolling means (15, 20, 115) intended to roll on the top of the teeth, where a common tangent thereof defines said rolling line (P), and where the tools (22) are arranged between them.

Preferably, said rolling means (15, 20, 115) are wheels and/or tracks.

In general, it is preferable for said tools to partially cross said rolling line.

According to some preferred embodiments the rolling surface (15, 16) has a diameter comprised in the range [50, 400] mm.

According to some preferred embodiments, the top delimitation comprises at least two wheels aligned in the advancing direction, with a pitch between them comprised in the range [150, 1000] mm.

According to a preferred general characteristic the machine comprises a rolling line on the top edge (3) of at least one plate (2), where said channel is arranged below said line.

According to some preferred embodiments said machine comprises a plate for protecting from waste arranged to pass over said channel.

DETAILED DESCRIPTION

Further characteristics and advantages of the present invention will become clearer from the following detailed description of preferred embodiments thereof, made with reference to the attached drawings and given for indicating and not limiting purposes. In such drawings.

Figure 1:
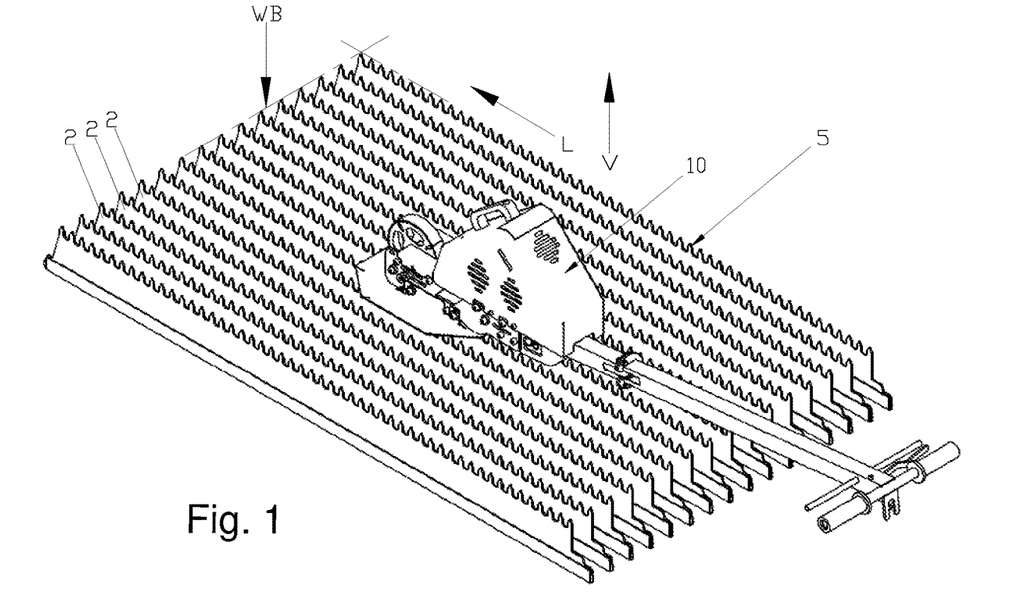
FIG. 1 schematically represents a perspective view of a work bench having planar grid of a laser cutting machine.

With reference to FIG. 1, a work bench of a machine for laser cutting is shown, wholly indicated with reference numeral 1. The bench 1 comprises a series of plates 2 with a longitudinal main direction of development L. As can be seen better in FIG. 2, each plate has a top longitudinal edge 3 and a lower longitudinal edge 4. The top edge 3 comprises a series of teeth 5. The plates also comprise two planar flanks 6 and 7 spaced apart by a constant thickness S and arranged to form mutually mirroring planes extending in the longitudinal direction L and between the top and lower edges 3, 4, their height H is such as to comprise the teeth 5, preferably their height coincides with the total height of the plate 2.

In use, the plates 2 are arranged parallel and spaced apart in the direction perpendicular to the direction L, to form a grid 1. The teeth 5 face upwards to define a horizontal support plane WB for the pieces to be cut.

During cutting, the waste deposits on the flanks 6 and 7 and between the teeth 5.

Figure 2:
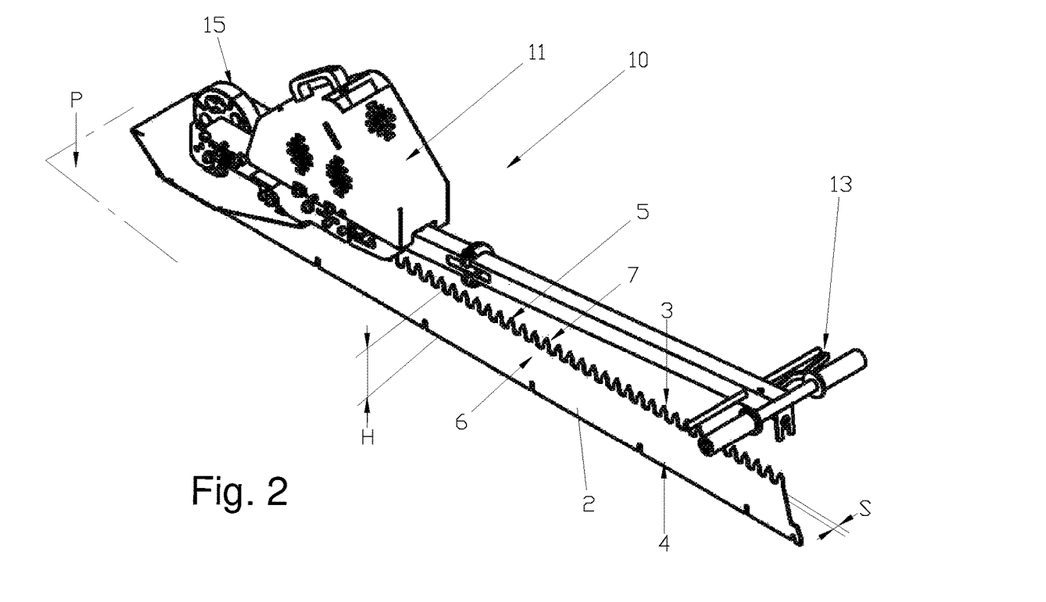
FIGS. 2 to 4 schematically represent a first embodiment according to the present invention of a machine for cleaning the grid of FIG. 1 through removal of waste, the machine being applied to a plate of the grid.
Figure 3:
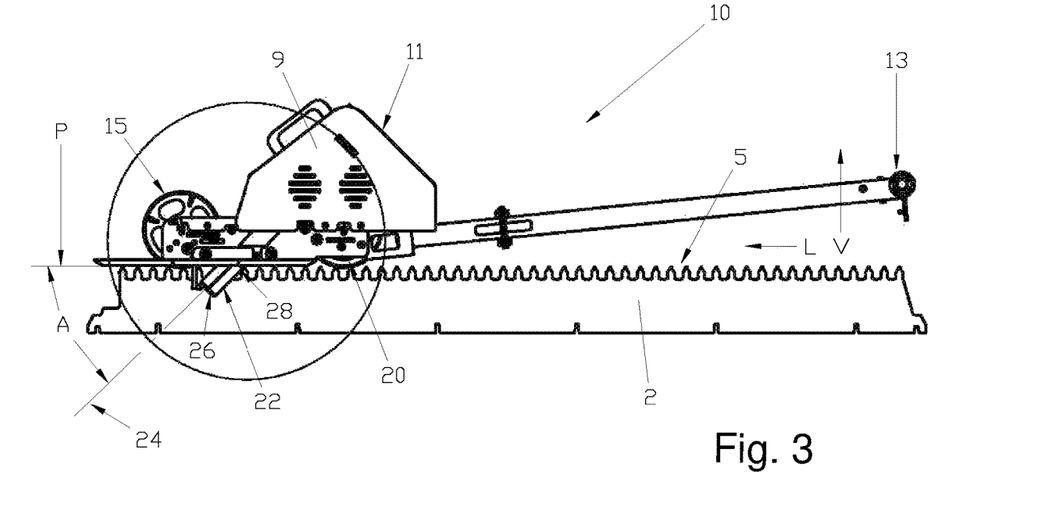
Figure 4:
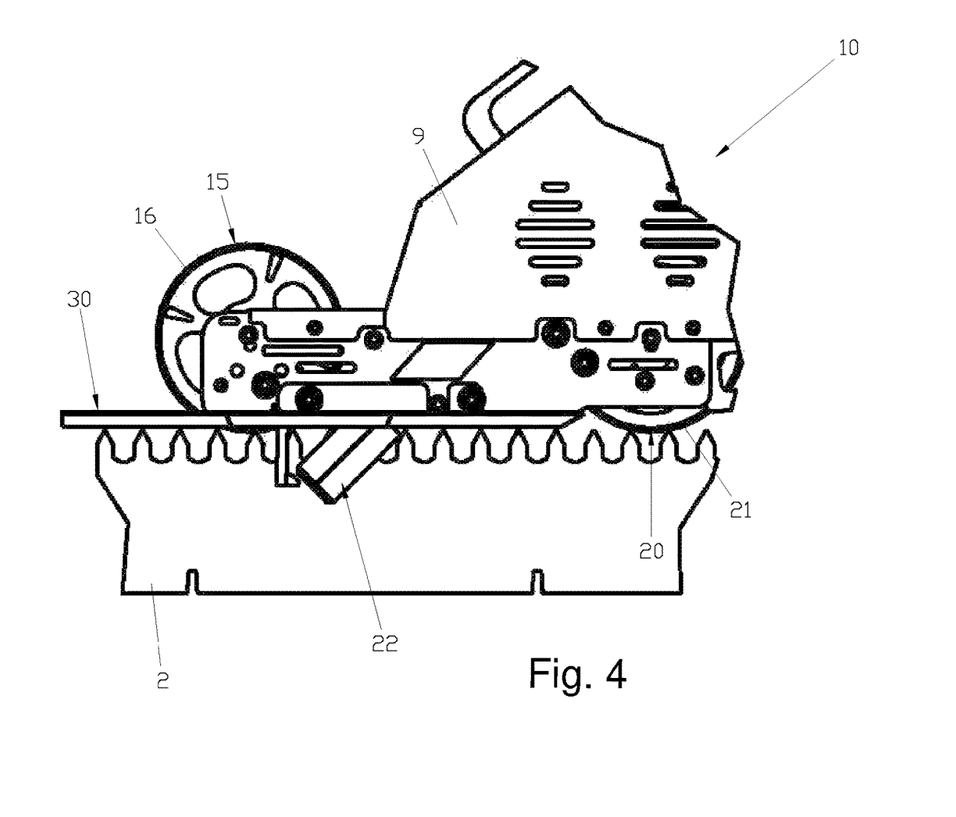

With reference to FIGS. 2, 3 and 4, a machine according to the present invention is illustrated, wholly indicated with reference numeral 10.

The machine 10 is devised to be rested on the teeth 5 of a plate 2 and have an advancing direction coinciding with the longitudinal development direction L of the plate 2.

Hereinafter, every direction will be meant to indicate in operating condition, for which reason the advancing direction L coincides with a horizontal direction and the vertical direction V is the one perpendicular to it.

The machine 10 has a main body 11 and a handgrip 13.

The main body 11 comprises a rolling line P on the teeth 5 (FIG. 3), preferably on their top, below which a plurality of tools 22 for cleaning waste are arranged so as to act on the flanks 6 and 7, as will be made clearer hereinafter.

The main body 11 comprises motor means 9 for actuating at least the tools 22, where said means 9 are preferably arranged above the rolling line P (FIG. 3).

Figure 7:
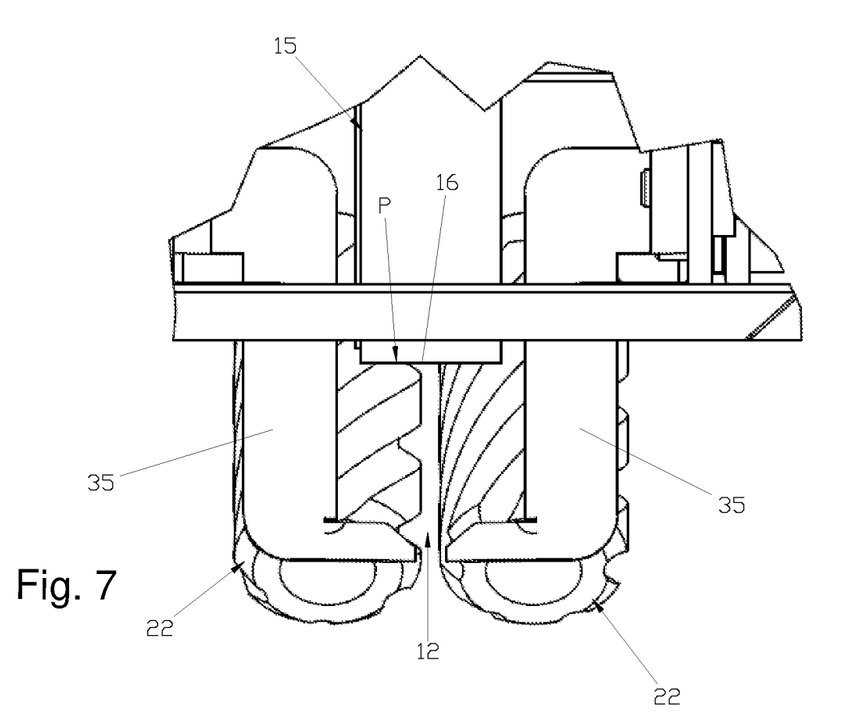
FIG. 7 represents a front view of the detail of FIG. 6.

In order to ride over one plate 2 at a time the main body 11 defines, below the rolling line P, a sliding channel 12 in direction L (FIG. 7) with a top delimitation 15, 20, a pair of lateral delimitations 22 and a downward-facing inlet opening.

The top delimitation defines the floating plane P and comprises the rolling surfaces 16 and 21 of a pair of wheels 15 and 20 (FIG. 4), aligned with each other so as to have at least one lower common tangent in the advancing direction L. At least the front wheel 15, more preferably also the rear wheel 20, are preferably intended to roll on the top of the teeth 5, as can be seen better in FIG. 5. It is essential that this happens at least for the front wheel 15 because it encounters areas with waste between the teeth, whereas the rear one encounters areas that are already clean. It is therefore acceptable even if less preferred for the rear wheel 20 to be toothed with equal pitch to the pitch of the teeth 5 of the plate 2, for example to be motorised.

The floating of the wheels 15 and preferably also 20 can be obtained for example thanks to their diameter and/or to the pitch between them with respect to the pitch of the teeth 5.

The diameter of the wheel for example is preferably related to the pitch of the teeth 5, so as to be sufficiently large to ensure the substantial floating on their top, i.e. without substantially penetrating between one tooth and the other where waste could be present.

As a preferred example, the wheels can have a diameter comprised in the range [50, 400] mm and a pitch comprised in the range [150, 1000] mm.

However, the factor that most influences the floating of a respective wheel is a rolling surface 16 or 21 that is preferably cylindrical, i.e. with a generatrix comprising a straight line arranged perpendicular to the axis of revolution coinciding with the axis of the respective wheel. In other words, the rolling surface has no indentations.

Figure 5:
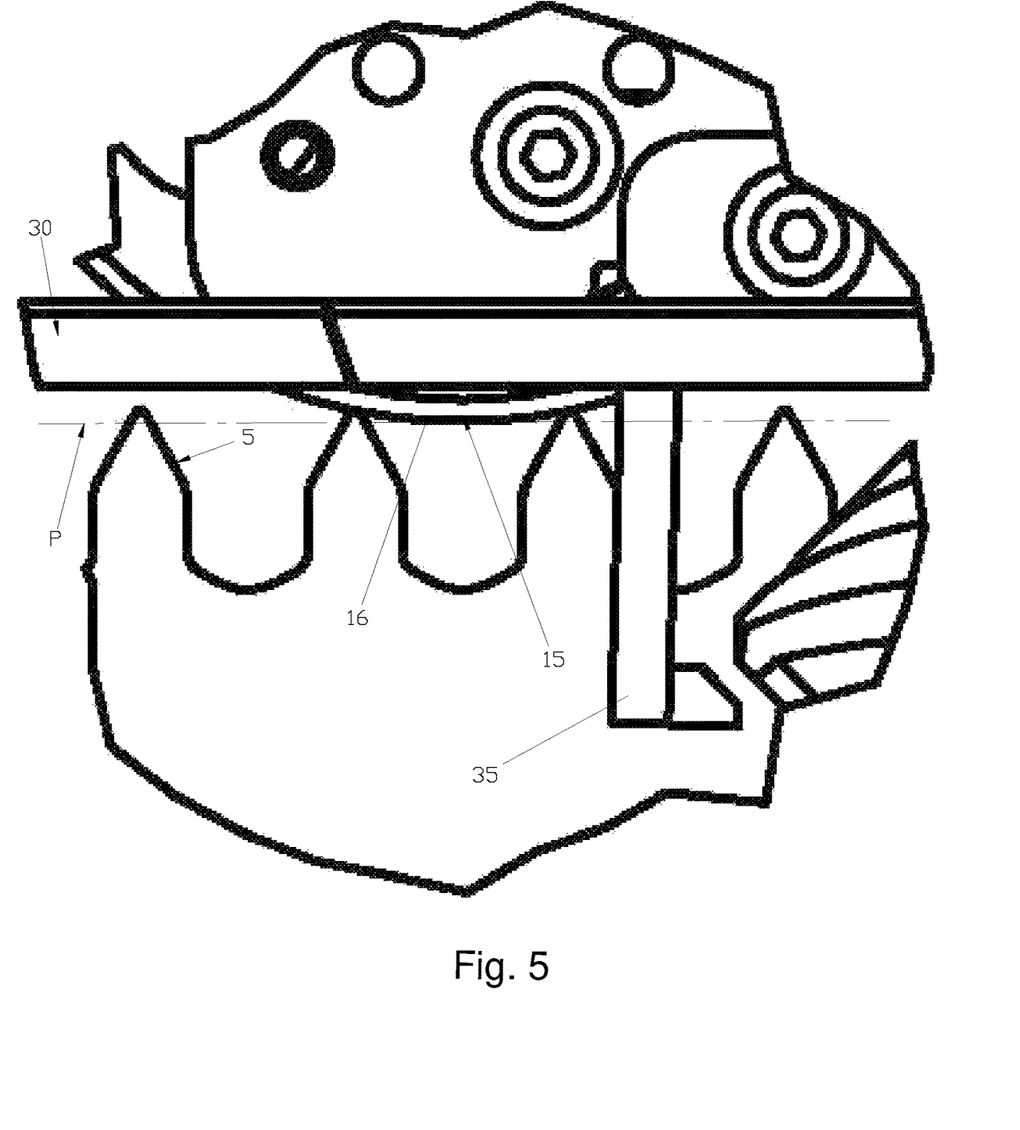
FIG. 5 represents an enlarged detail of FIG. 3.
Figure 6:
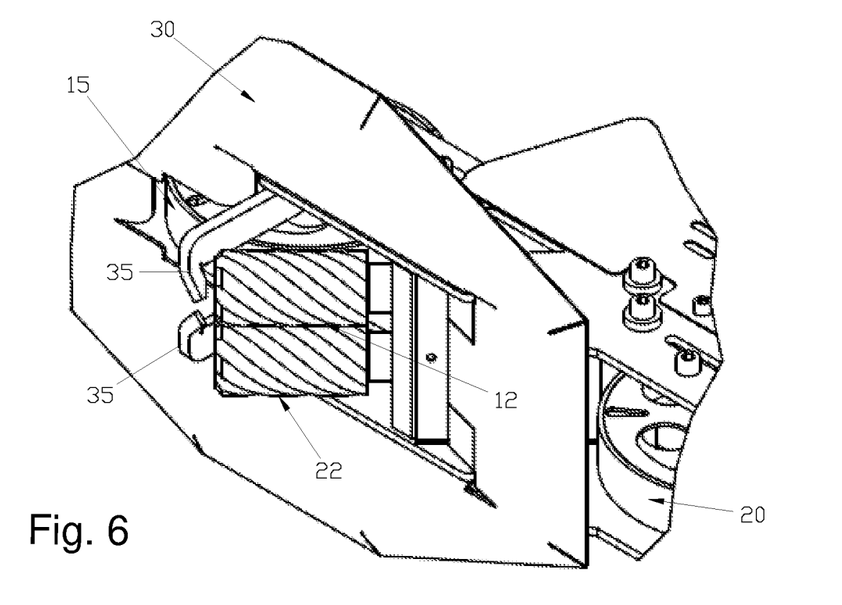
FIG. 6 schematically represents a perspective view from below of a detail of the machine of the previous figures.

As will be noted in FIG. 5, the rolling line P will not coincide exactly, but in any case substantially, with the top of the teeth 5, through the approximation given by the diameter of the wheels 15 and 20, by to what extent the rear wheel 20 is cylindrical, by the presence of waste, etc.

Above the rolling line P, and spaced from it, it is possible to provide a plate 30 for protecting from the waste deriving from the action of the tools 22 (FIG. 5).

The lateral delimitations of the channel 12 are defined by respective rotary tools 22, for example a pair of mills. They are both arranged, in the advancing direction L, between the two wheels 15 and 20, whereas in the vertical direction they have the rotation axes 24 parallel to one another and projecting below the rolling line P. Preferably, said axes 24 are inclined to form an angle A with the advancing direction L so that the lower end 26 of the mill is more advanced with respect to the upper end 28. The angle A is preferably comprised between 45° and 60° where the preferred values are between 45° and 50°, including extreme values.

The distance between the tools 22 is sufficient to house the thickness S of a plate 2, and preferably is adjustable.

An optional addition guide for the plate 2 to be cleaned in the direction L is given by a pair of flanges 35 facing through the channel 12 and therefore intended to be arranged beside opposite flanks 6, 7 of said plate 2.

In use, the machine 10 is positioned to ride over a single plate 2 at a time, inserting the latter in the channel 12 and between the flanges 35. The machine 10 is moved forwards and backwards along the plate 1 through the handgrip 13, or in a motorised manner (in which case the handgrip is optional). The tools 22 rotate so as to pull at least the front wheel 15 to it when they act on the flanks 6 and 7 of the plate 2.

Thanks to the principle of rolling on the teeth the latter do not undergo wearing, and at the same time the wheels ensure a solid resting point that balances the downward pull given by the action of the rotary tools, which can therefore be strong and thus more effective with respect to the prior art. The floating on the top of the teeth at least of the front wheel improves the precision and the fluidity of operation, since it is not distorted by the waste between the teeth.

Figure 8:
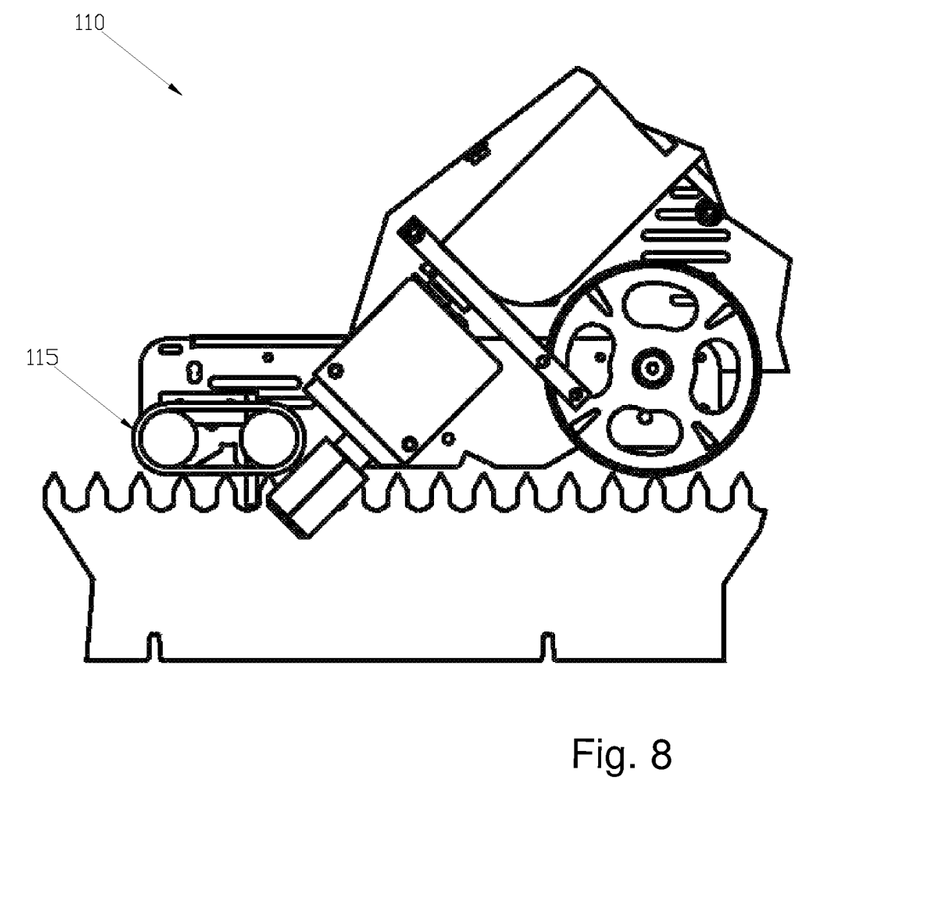
FIG. 8 schematically represents an alternative embodiment of the machine of the previous figures.

FIG. 8 represents an alternative embodiment of a cleaning machine, wholly indicated with reference numeral 110. Identical or similar elements of said machine are indicated with the same reference numerals used earlier or with the same numerals plus 100.

The machine 110 differs from the machine 10 mainly by the front wheel 15 that is replaced by a track 115.

Otherwise the operation and the structure are substantially the same since both the wheel 15 and the track 115 are examples of revolving means arranged to define a rolling line P on the surface of the teeth 5. According to some variants it is not ruled out for also or only the rear wheel 16 to be replaced by a track, or for both the front and rear wheels to be replaced by a single track extending in front of and behind the tools 22. Ultimately, every combination of wheels or tracks is contemplated, and they can be free or motorised.

Finally, it is clear that less preferred embodiments are also contemplated such as those that comprise an area for resting at the top of the teeth 5 that precedes the tools 22 and a resting area that follows the tools, where only one of the two has a rolling surface, whereas the other has a sliding surface. For example, the area that follows can comprise a sled or other surface sliding on the teeth, whereas the area that precedes comprises a rolling surface.

GENERAL INTERPRETATION OF THE TERMS

In understanding the purpose of the present invention, the term "comprising" and its derivatives, as used here, are meant as open-ended terms that specify the presence of the declared characteristics, elements, components, groups, whole numbers and/or steps, but they do not rule out the presence of other characteristics, elements, components, groups, whole numbers and/or steps that are not declared. The above also applies to the words that have similar meanings like the terms "comprised", "have" and their derivatives. Moreover, the terms "part", "section", "portion", "member" or "element" when used in the singular can have the dual meaning of a single part or of a plurality of parts. As used here to describe the above embodiment(s), the following directional terms "forwards", "backwards", "above", "below", "vertical", "horizontal", "under" and "transversal", as well as any other similar directional term refers to the embodiment described in operative position. Finally, terms of degree like "substantially", "about" and "approximately" as used here mean a reasonable amount of deviation of the modified term so that the end result is not significantly changed.

While only certain embodiments have been selected to illustrate the present invention, it will be clear to those skilled in the art from this description that various modifications and variants can be made without departing from the scope of the invention as defined in the attached claims. For example, the size, the shape, the position or the orientation of the various components can be changed according to requirements and/or wishes. The components shown directly connected or in contact with each other can have intermediate structures arranged between them. The functions of one element can be carried out by two and vice-versa. The structures and the functions of an embodiment can be adopted in another embodiment. It is not necessary for all of the advantages to be present in one particular embodiment at the same time. Every characteristic that is original compared to the prior art, by itself or in combination with other characteristics, should also be considered a separate description of further inventions by the Applicant, including the structural and/or functional concepts incorporated by such characteristics. Therefore, the previous descriptions of the embodiments according to the present invention are provided only for illustrating purposes and not for the purpose of limiting the invention as defined by the attached claims and by their equivalents.

The invention claimed is:

1. Machine for the removal of waste from work benches of work machines, where the work benches comprise a series of plates arranged parallel to one another to form a grid, have a longitudinal development direction and a top edge equipped with teeth, where the top of the teeth defines a horizontal support plane for pieces to be worked,     the machine for the removal of waste comprises a main body equipped with at least one channel suitable for riding over at least one plate of said grid and for sliding with respect to the grid in an advancing direction coinciding with said longitudinal development direction;

wherein said channel comprises a top delimitation, a pair of lateral delimitations and a downward-facing inlet opening;

wherein the lateral delimitations of the channel are defined by respective rotary tool;

wherein the top delimitation comprises at least one rolling surface capable of rolling in the advancing direction so as to advance on the top edge,     wherein said tools have rotation axes inclined with respect to the advancing direction (L) and rotate so as to pull down the rolling surface when they act on the flanks of the plate (2) inserted in the channel.

2. Machine for the removal of waste according to claim 1, wherein said top delimitation comprises at least two areas intended to rest on the surface of the teeth, where one area precedes and the other follows said rotary tools in said advancing direction, where at least one of said areas comprises said at least one rolling surface.

3. Machine for the removal of waste according to claim 2, wherein said rolling surface at least partially precedes the position of said rotary tools, in the advancing direction.

4. Machine for the removal of waste according to claim 2, wherein both of said areas comprise at least one rolling surface.

5. Machine for the removal of waste according to claim 1, wherein said at least one rolling surface is a surface of cylindrical revolution or the surface of a track.

6. Machine for the removal of waste according to claim 5, wherein the surface of the track intended to define the top delimitation for resting on the top of the teeth is flat.

7. Machine for the removal of waste according to claim 1, wherein at least said rolling surface that at least partially precedes the position of said rotary tools is a surface of cylindrical revolution or a flat surface of a track.

8. Machine for the removal of waste according to claim 7, wherein both of said rolling surfaces are a surface of cylindrical revolution or a flat surface of a track.

9. Machine for the removal of waste according to claim 1, wherein said top delimitation defines a rolling line on the top of the teeth.

10. Machine for the removal of waste according to claim 9, wherein, with reference to the advancing direction, said top delimitation comprises at least one front rolling means and a rear rolling means configured to roll on the top of the teeth, where a common tangent thereof defines said rolling line, and where the tools are arranged between them.

11. Machine for the removal of waste according to claim 10, wherein said rolling means are wheels and/or tracks.

12. Machine for the removal of waste according to claim 9, wherein said tools partially cross said rolling line.

13. Machine for the removal of waste according to claim 1, wherein the rolling surface has a diameter comprised in the range 50-400 mm.

14. Machine for the removal of waste according to claim 1 wherein the top delimitation comprises at least two wheels aligned in the advancing direction, with a pitch between them comprised in the range 150-1000 mm.

15. Machine for the removal of waste according to claim 1, further comprising a rolling line on the top edge of at least one plate, where said channel is arranged below said line.

16. Machine for the removal of waste according to claim 1, further comprising a plate for protecting from waste arranged to pass over said channel.

* * * * *